(12) United States Patent
Scales

(10) Patent No.: US 11,596,258 B2
(45) Date of Patent: Mar. 7, 2023

(54) LEAK RESISTANT COOKING PAN

(71) Applicant: Capri Scales, The Bronx, NY (US)

(72) Inventor: Capri Scales, The Bronx, NY (US)

(73) Assignee: Capri Scales, Bronx, NY (US)

( * ) Notice: Subject to any disclaimer, the term of this patent is extended or adjusted under 35 U.S.C. 154(b) by 238 days.

(21) Appl. No.: 17/102,569

(22) Filed: Nov. 24, 2020

(65) Prior Publication Data

US 2022/0160176 A1     May 26, 2022

(51) Int. Cl.
| | |
|---|---|
| *A47J 27/02* | (2006.01) |
| *A47J 36/02* | (2006.01) |
| *A47J 36/10* | (2006.01) |
| *A47J 27/08* | (2006.01) |
| *A47J 36/06* | (2006.01) |
| *A47J 36/04* | (2006.01) |
| *B65D 53/00* | (2006.01) |
| *A47J 27/022* | (2006.01) |

(52) U.S. Cl.
CPC .............. *A47J 27/022* (2013.01); *A47J 27/02* (2013.01); *A47J 27/0811* (2013.01); *A47J 36/025* (2013.01); *A47J 36/04* (2013.01); *A47J 36/06* (2013.01); *A47J 36/064* (2022.01); *A47J 36/10* (2013.01); *B65D 53/00* (2013.01)

(58) Field of Classification Search
CPC ...... A47J 27/022; A47J 27/02; A47J 27/0811; A47J 27/0804; A47J 27/08; A47J 36/025; A47J 36/04; A47J 36/06; A47J 36/064; A47J 36/10; B65D 53/00; B65D 47/32; B65D 45/16

USPC ......... 220/573.3, 573.1, 912, 795, 378, 780; 277/639, 637, 628, 650
See application file for complete search history.

(56) References Cited

U.S. PATENT DOCUMENTS

| | | | | |
|---|---|---|---|---|
| 3,696,962 | A * | 10/1972 | Fehres ................... | B65D 45/32 220/675 |
| 4,305,535 | A * | 12/1981 | Brundige ........... | B65D 21/0222 220/780 |
| 4,887,736 | A * | 12/1989 | VanCucha .......... | B65D 43/0212 220/795 |
| 5,921,432 | A * | 7/1999 | Van Berne ......... | B65D 43/0218 220/795 |
| 6,695,319 | B1 * | 2/2004 | Anota ..................... | A47J 27/09 220/203.11 |
| 2010/0288784 | A1 * | 11/2010 | Alvares .............. | B65D 43/0249 220/780 |

FOREIGN PATENT DOCUMENTS

JP          05084846 A  *  4/1993   .........  B65D 43/0218

* cited by examiner

*Primary Examiner* — Robert J Hicks
(74) *Attorney, Agent, or Firm* — Fish & Richardson P.C.

(57) ABSTRACT

An embodiment described in examples herein provides a leak resistant cooking pan. The leak resistant cooking pan includes a body and a lid. The lid includes a grooved rim sized to fit over a top edge of a sidewall of the body, wherein the grooved rim includes a heat resistant elastomer, and wherein the heat resistant elastomer forms a seal between the lid and the body.

20 Claims, 5 Drawing Sheets

LEAK RESISTANT COOKING PAN

TECHNICAL FIELD

The present disclosure is directed to a leak resistant cooking pan with a lid having a seal to keep contents from spilling during movement or transportation.

BACKGROUND

Transporting cooked foods is often difficult due to the likelihood of spilling hot food during movement. Disposable aluminum pans are available that have lids that can be placed on the edges of the pan, with an overlapping aluminum section that can fold over the lid. However, the seal of the aluminum pans is often poor, leading to spills, for example, when single pans are transported without a rack. Further, the flexibility of the aluminum pans increase the risk of spillage during cooking.

SUMMARY

An embodiment described in examples herein provides a leak resistant cooking pan. The leak resistant cooking pan includes a body and a lid. The lid includes a grooved rim sized to fit over a top edge of a sidewall of the body, wherein the grooved rim includes a heat resistant elastomer, and wherein the heat resistant elastomer forms a seal between the lid and the body.

DETAILED DESCRIPTION

Embodiments described in examples herein provide a leak resistant cooking pan. As used herein, the leak resistant cooking pan includes a body and a lid configured to seal to the body. The body of the leak resistant cooking pan is rigid and, in some embodiments, has handles for easier lifting. A lid with a diameter slightly larger than the body has a grooved rim configured to fit over the sidewall of the body. In some embodiments, the lid has a handle. The grooved rim includes a heat resistant elastomer, such as an O-ring, that forms a seal between the lid and the body. In some embodiments, latches are included to fasten the lid to the pan during transportation.

The latches may not be used, as condensation in the leak resistant cooking pan during cooling may provide a partial vacuum in the leak resistant cooking pan that holds the lid in place during transportation. In some embodiments, an air inlet valve is mounted through the lid to allow air to be released into the leak resistant cooking pan. The air inlet valve may be used to break any partial vacuum that may have formed and allow the lid to be easily lifted from the body.

Figure 1B:
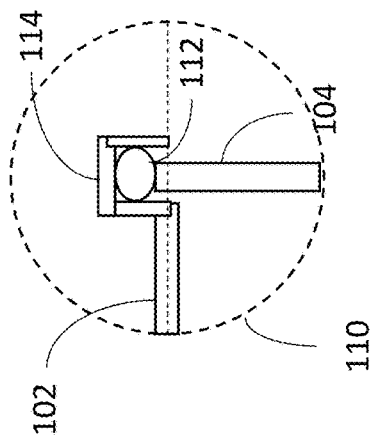
FIGS. 1B-1D are cross-sectional views of the contact between a heat resistant elastomer in a grooved rim in the lid and a sidewall of the body of the leak resistant cooking pan.
Figure 1D:
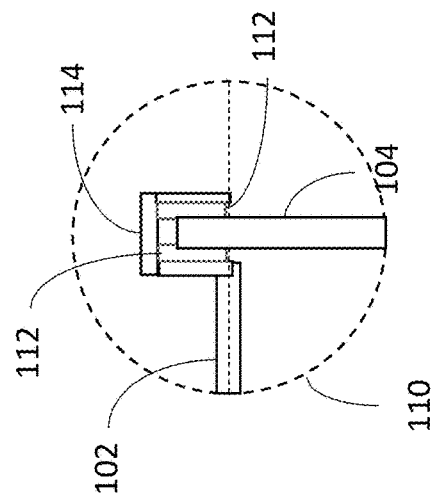
Figure 1A:
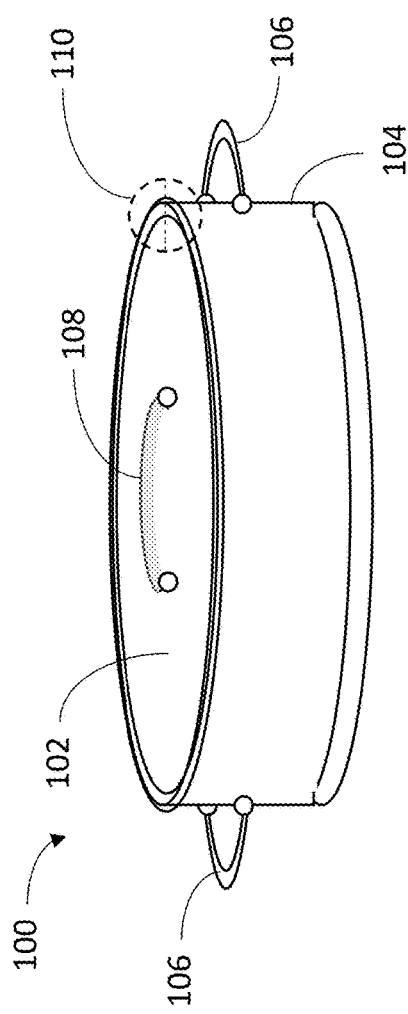
FIG. 1A is a perspective view of a leak resistant cooking pan fitted with a lid that seals to the body of the leak resistant cooking pan.

FIG. 1A is a perspective view of a leak resistant cooking pan 100 fitted with a lid 102 that seals to the body 104 of the leak resistant cooking pan 100. In this illustration, the body 104 has handles 106 for easier handling. Similarly, the lid 102 has a handle 108 to enable the lid 102 to be placed over the body 104. The handles 106 or 108 may be fixed in place, or may be attached by hinges to allow the handle 106 or 108 to swivel.

Any number of materials may be used to form the leak resistant cooking pan 100. In various embodiments, the lid 102, the body 104, or both, are made from steel, copper, a steel alloy, a copper alloy, or aluminum, or any combinations thereof. In some embodiments, body 104 includes a glass, a ceramic, or both. Although the leak resistant cooking pan 100 is shown with a cylindrical shape in examples provided herein, the leak resistant cooking pan 100 may be formed in any number of shapes. In various embodiments, the shape of the leak resistant cooking pan 100 is cylindrical, oval, square, or rectangular. After food is cooked in the body 104, the lid 102 is placed over the body 104 to seal the leak resistant cooking pan 100.

Figure 1C:
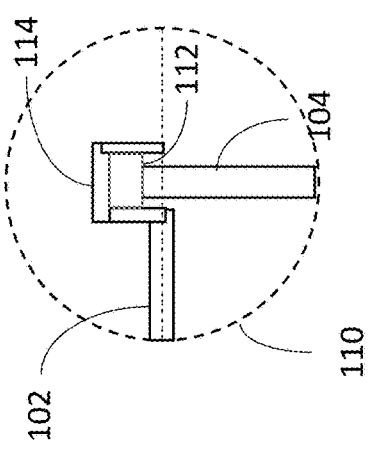

FIGS. 1B-1D are cross-sectional views of the contact between a heat resistant elastomer in a grooved rim in the lid and a sidewall of the body of the leak resistant cooking pan. These figures shown the formation of the FIG. 1B is a cross-sectional view 110 of an edge of the lid 102 of the leak resistant cooking pan 100 showing contact between a heat resistant elastomer 112 in a grooved rim 114 in the lid 102 and a top edge of a sidewall of the body 104. Like numbered items are as described with respect to FIG. 1A. The contact between the sidewall of the body 104 and the heat resistant elastomer 112 in the grooved rim 114 of the lid 102 may form an airtight seal retaining contents and the leak resistant cooking pan 100.

In the embodiment of FIG. 1B, the heat resistant elastomer 112 is an O-ring with a circular profile. In other embodiments, the heat resistant elastomer 112 is an O-ring with a flattened profile, as shown in FIG. 1C, or a liner along the interior sides of the grooved rim 114 that engages the top edge of the sidewall of the body 104 with a pressure fit, as shown in FIG. 1D.

The heat resistant elastomer 112 may be formed from any number of heat resistant polymers that are FDA approved for direct food contact, for example, with hot foods with a high fat content, such as roast beef, lasagna, and the like. Suitable elastomers are provided on the FDA "white list," for example, at 21 C.F.R. § 177.2600. In some embodiments, the heat resistant elastomer 112 is a silicone polymer. In other embodiments, the heat resistant elastomer 112 is a nitrile rubber, an EPDM rubber, or a neoprene rubber, among others.

Figure 2A:
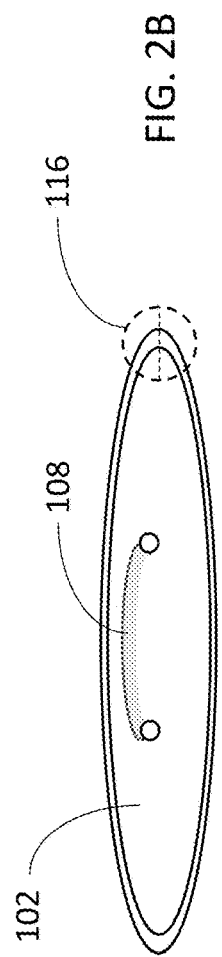
FIG. 2A is a perspective view of the lid of the leak resistant cooking pan.

FIG. 2A is a perspective view of the lid 102 of the leak resistant cooking pan 100. Like numbered items are as described with respect to previous figures. A cross-sectional view 116 is shown in FIG. 2B.

Figure 2B:
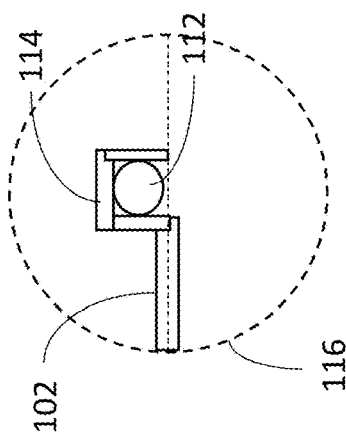
FIG. 2B is a cross-sectional view of an edge of the lid of the leak resistant cooking pan showing the heat resistant elastomer in the grooved rim of the lid.

FIG. 2B is a cross-sectional view 116 of an edge of the lid 102 of the leak resistant cooking pan 100 showing the heat resistant elastomer 112 in the grooved rim 114 of the lid 102. Like numbered items are as described with respect to previous figures.

Figure 3A:
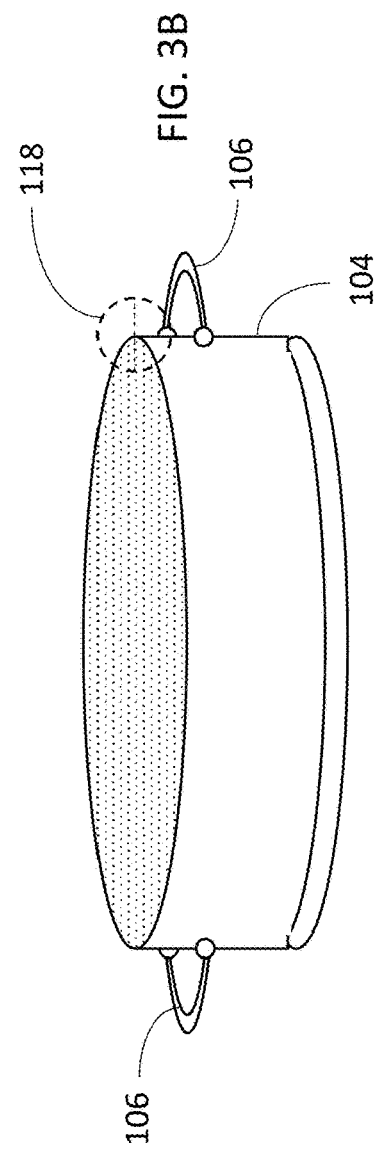
FIG. 3A is a perspective view of the body of the leak resistant cooking pan.
Figure 3B:
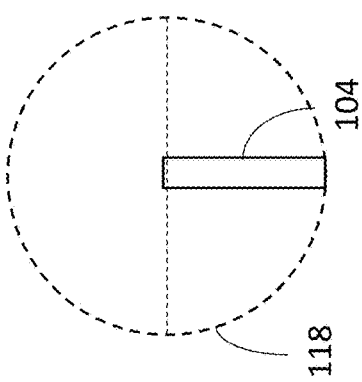
FIG. 3B is a cross-sectional view of an edge of the body of the leak resistant cooking pan showing the sidewall.

FIG. 3A is a perspective view of the body 104 of the leak resistant cooking pan 100. A cross-sectional view 118 of the sidewall is shown in FIG. 3B. Like numbered items are as described with respect to previous figures.

FIG. 3B is a cross-sectional view 118 of an edge of the body 104 of the leak resistant cooking pan 100 showing the sidewall. Like numbered items are as described with respect to previous figures.

Figure 4B:
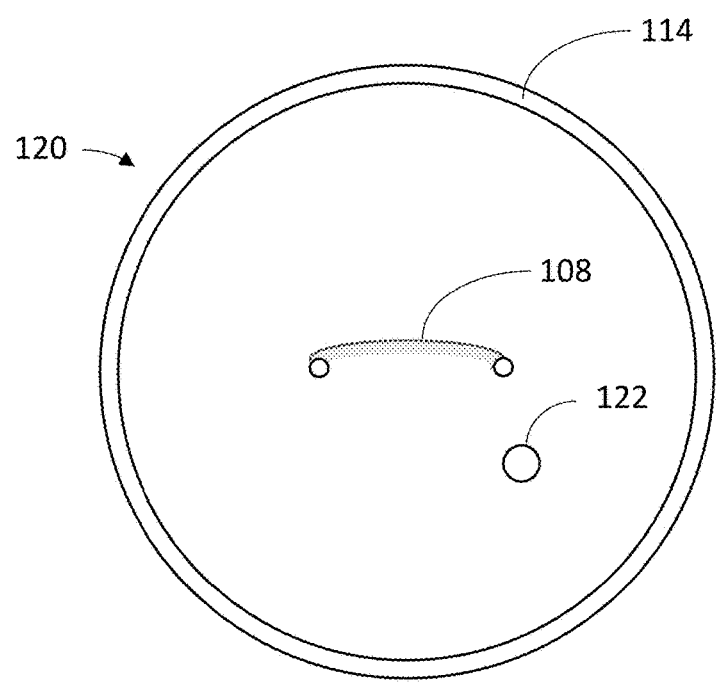
FIG. 4B is a top view of the lid of the leak resistant cooking pan with the air inlet valve.
Figure 4A:
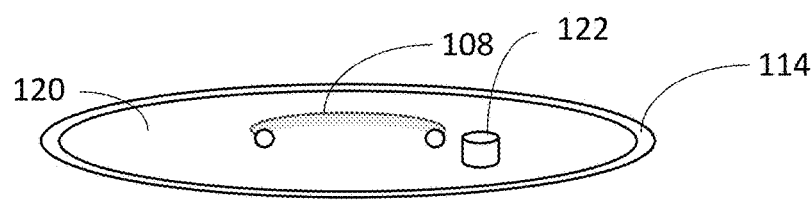
FIG. 4A is a perspective view of another lid of the leak resistant cooking pan (FIG. 1A) showing an air inlet valve.

FIG. 4A is a perspective view of another lid 120 of the leak resistant cooking pan 100 (FIG. 1A) showing an air inlet valve 122. Like numbered items are as described with respect to previous figures. In some embodiments, the seal between the lid 120 and the body 104 (FIG. 1A) will be airtight. As the food in the leak resistant cooking pan 100 cools, a partial vacuum may hold the lid 120 tightly to the body 104. Advantageously, this will decrease the likelihood of spills.

However, a partial vacuum may make the lid 120 difficult to remove. In the embodiment of FIG. 4A, the air inlet valve 122 is configured to allow air to enter the leak resistant cooking pan 100 and release the partial vacuum. The air inlet valve 122 may have any number of configurations. In some embodiments, the air inlet valve 122 is formed from a threaded top piece that screws down over an air inlet port 124 (FIG. 4C) through the lid 120. In other embodiments, the cover of the air inlet valve 122 rotates to expose a hole that is coupled to the air inlet port 124 through the lid 120.

FIG. 4B is a top view of the lid of the leak resistant cooking pan with the air inlet valve 122. Like numbered items are as described with respect to previous figures.

Figure 4C:
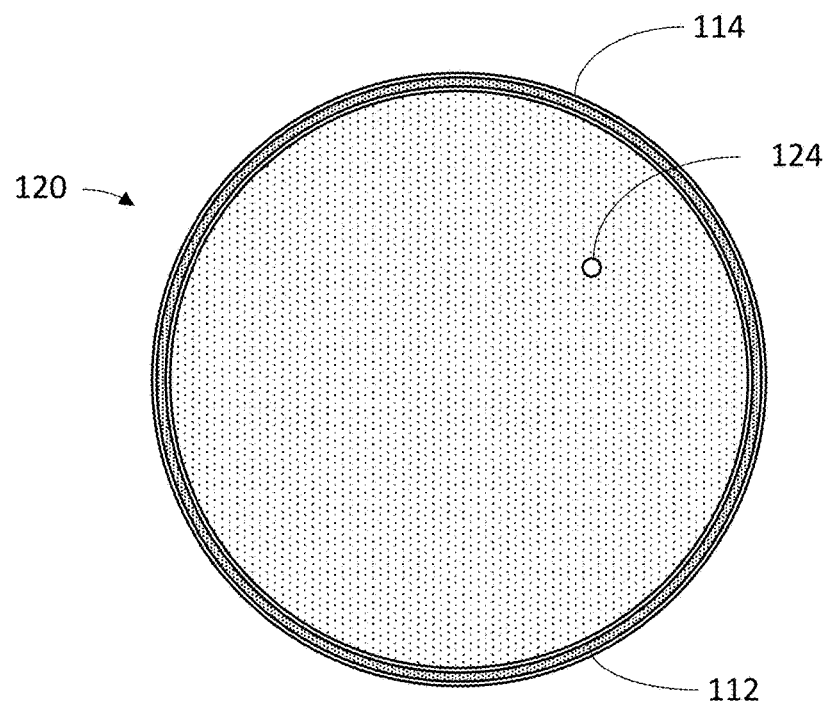
FIG. 4C is a bottom view of the lid of the leak resistant cooking pan showing the air inlet port below the air inlet valve.

FIG. 4C is a bottom view of the lid of the leak resistant cooking pan showing the air inlet port 124 below the air inlet valve 122. Like numbered items are as described with respect to previous figures.

Figure 5A:
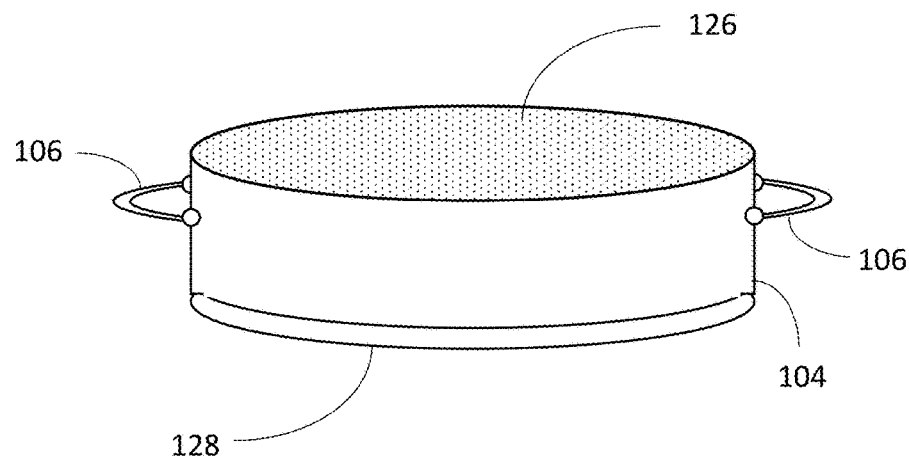
FIG. 5A is a perspective view of the body of the leak resistant cooking pan.

FIG. 5A is a perspective view of the body 104 of the leak resistant cooking pan 100. Like numbered items are as described with respect to previous figures. The interior surface 126 of the leak resistant cooking pan 100 may be formed from a non-stick material. In various embodiments, the non-stick material is a ceramic, a fluoropolymer, or an oxidized aluminum. The base 128 of the body 104 of the leak resistant cooking pan 100 may be thicker than the sidewall, which will more evenly distribute heat in the leak resistant cooking pan 100 than a thinner base, for example, when the leak resistant cooking pan 100 is set on a burner on a stove.

In various embodiments, the sidewall of the body 104 may be 1 millimeters (mm) in thickness, 2 mm in thickness, 3 mm in thickness, or 4 mm in thickness, or greater. In various embodiments, the base 128 of the body 104 may be 3 millimeters (mm) in thickness, 5 mm in thickness, 7 mm in thickness, or 10 mm in thickness, or larger. Generally, the thickness of the leak resistant cooking pan 100 may be greater than comparable pans, to prevent indenting or collapse under a partial vacuum. The lid 102 or 120 of the leak resistant cooking pan 100 will generally be the same thickness as the sidewall of the body 104, as a common metal stock will most likely be used to form the sidewall of the body 104 and the lid 102 or 120.

Figure 5B:
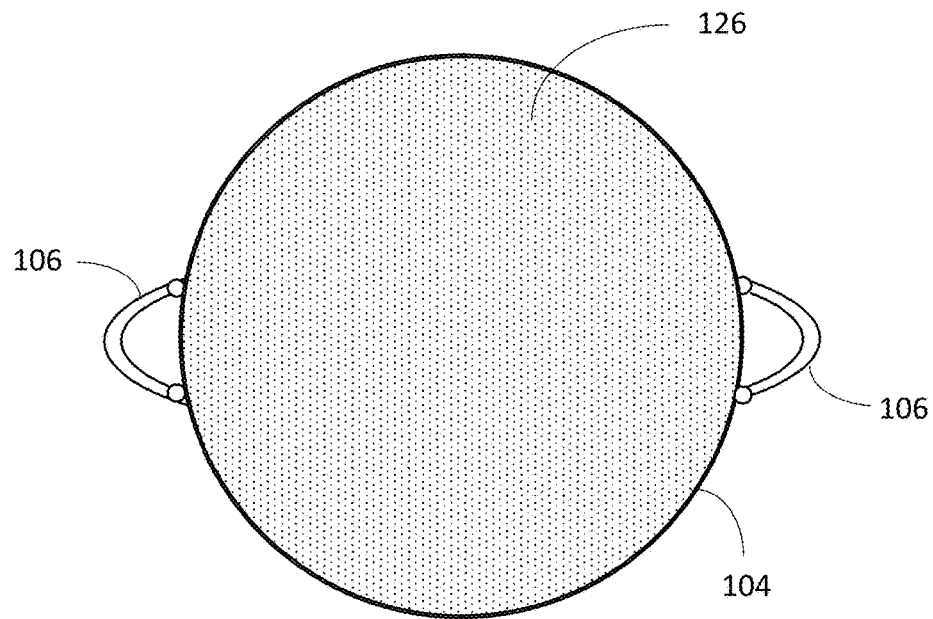
FIG. 5B is a top view of the body of the leak resistant cooking pan, showing the interior surface.

FIG. 5B is a top view of the body 104 of the leak resistant cooking pan 100, showing the interior surface 126. Like numbered items are as described with respect to previous figures. In this example, the body 104 is round, forming a cylindrical shape. As described herein, the leak resistant cooking pan 100 may be square, oval, or rectangular. Like numbered items are as described with respect to previous figures.

Figure 6A:
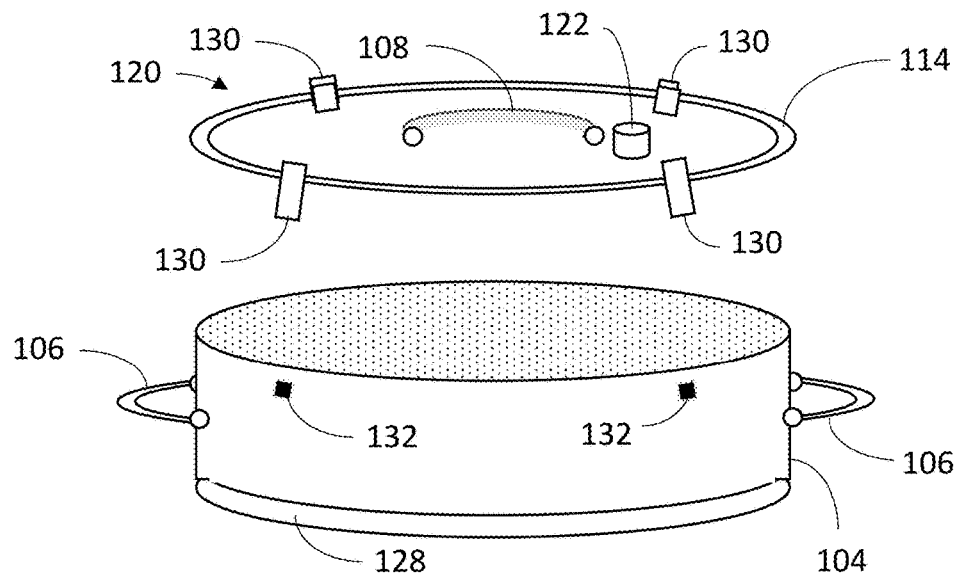
FIG. 6A is a perspective view of a leak resistant cooking pan that includes latches attached to the lid to attach to protrusions on the body.

FIG. 6A is a perspective view of a leak resistant cooking pan that includes latches 130 attached to the lid 120 to attach to protrusions 132 on the body 104. Like numbered items are as described with respect to previous figures. In this example, the lid 120 includes the air inlet valve 122. However, the latches 130 could be used with the lid 102 described with respect to FIGS. 1A and 1B. The protrusions 132 may be square with a recessed lip, round, mushroom shaped, and the like. In an embodiment, the latches 130 have a fixed portion attached to the lid 120, and a swinging portion mounted on a hinge, or hinged assembly, and configured to engage the corresponding protrusions 132.

In some embodiments, a square latch is configured to extend over a square protrusion, engaging with a recess on the protrusion. The latch can then be engaged, such as by pushing a top portion towards the leak resistant cooking pan 100, to lock the latch and apply a downward force on the lid 120. In other embodiments, a latch with a flexible portion is configured to engage with a mushroom shaped protrusion, applying a downward force to the lid 120.

Figure 6B:
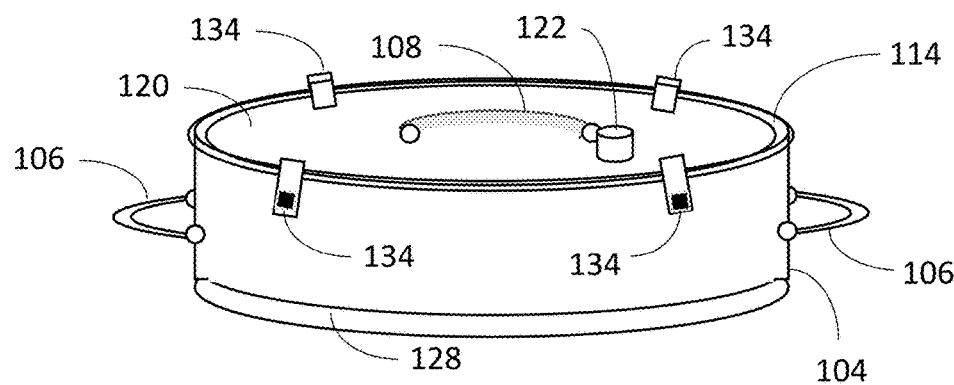
FIG. 6B is a perspective view of the leak resistant cooking pan of FIG. 6A with the lid fixed to the body by the latches.
Figure 7:
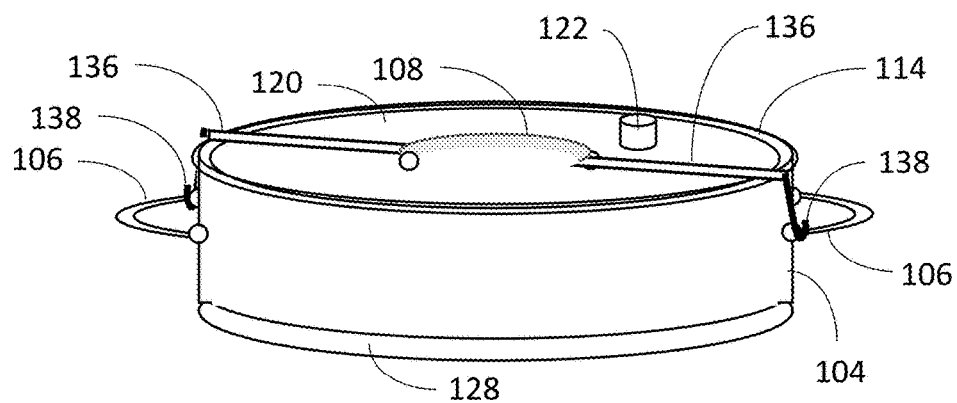
FIG. 7 is a perspective view of a leak resistant cooking pan with an alternative latching mechanism.

FIG. 6B is a perspective view of the leak resistant cooking pan of FIG. 6A with the lid 120 fixed to the body 104 by the latches 130. Like numbered items are as described with respect to previous figures. In this example, the latches 130 are placed over the protrusions 132 on the body 104 and locked into place, forming latched assemblies 134 that hold the lid 120 to the body 104. The latching mechanism is not limited to mechanical latches, as shown in FIGS. 6A and 6B FIG. 7 is a perspective view of a leak resistant cooking pan 100 with an alternative latching mechanism. Like numbered items are as described with respect to previous figures. In this embodiment, flexible cords 136 are fixed to the handle 108 of the lid 120, for example, at each end. The flexible cords 136 are attached to hooks 138 at an opposite end from the handle 108. The hooks 138 engage the handles 106 of the body 104, applying a downward force to hold the lid 120 to the body 104. In some embodiments, the handles 106 each have a hole for the insertion of the hooks 138. In other embodiments, such as shown in FIG. 7, the hooks 138 are placed over the handles 106.

The flexible cord 136 may be made from a heat resistant elastomeric polymer, such as the heat resistant elastomer 112 described with respect to FIG. 2B. The hooks 138 may be formed from a rigid plastic or from metal. In some embodiments, the hooks 138 are formed from a food-grade polyphenylene oxide (PPO), a food-grade polyphenylene sulfide (PPS), and the like. In other embodiments, the hooks 138 are formed from stainless steel.

An embodiment described in examples herein provides a leak resistant cooking pan. The leak resistant cooking pan includes a body and a lid. The lid includes a grooved rim sized to fit over a top edge of a sidewall of the body, wherein the grooved rim includes a heat resistant elastomer, and wherein the heat resistant elastomer forms a seal between the lid and the body.

In an aspect, the grooved rim has an inner diameter that is smaller than an inner diameter of the body and an outer diameter that is larger than an outer diameter of the body. In an aspect, the heat resistant elastomer includes an O-ring with a circular profile inserted in the grooved rim of the lid. In an aspect, the heat resistant elastomer includes an O-ring with a flattened profile placed in the grooved rim of the lid.

In an aspect, the heat resistant elastomer is placed along an inner diameter and an outer diameter of the grooved rim. In an aspect, the top edge of the sidewall of the body forms a pressure fit between the heat resistant elastomer along the inner diameter and the outer diameter of the grooved rim. In an aspect, the heat resistant elastomer includes a silicone polymer.

In an aspect, the leak resistant cooking pan includes a cylindrical shape or an oval shape. In an aspect, the body includes a thickened base configured to distribute heat.

In an aspect, the leak resistant cooking pan includes a latch configured to hold the lid to the body. In an aspect, the latch includes a hinged assembly mounted to the lid, wherein the hinged assembly is configured to lock to a protrusion mounted to the body. In an aspect, the latch includes a flexible cord. In an aspect, the flexible cord is mounted to a handle on the lid. In an aspect, a hook is configured to attach to a handle on the body.

In an aspect, the leak resistant cooking pan includes an air inlet valve to allow air to flow into the leak resistant cooking pan.

In an aspect, the body includes steel, copper, a steel alloy, a copper alloy, or aluminum, or any combinations thereof. In an aspect, the body includes glass, or ceramic, or both.

In an aspect, an interior surface of the body includes a non-stick material. In an aspect, the non-stick material includes a ceramic. In an aspect, the non-stick material includes a fluoropolymer.

Other implementations are also within the scope of the following claims.

What is claimed is:

1. A leak resistant cooking pan, comprising:
   a body; and
   a lid comprising a grooved rim sized to fit over a top edge of a sidewall of the body, wherein the grooved rim comprises a heat resistant elastomer, and wherein the heat resistant elastomer forms a seal between the lid and the body.

2. The leak resistant cooking pan of claim 1, wherein the grooved rim has an inner diameter that is smaller than an inner diameter of the body and an outer diameter that is larger than an outer diameter of the body.

3. The leak resistant cooking pan of claim 1, wherein the heat resistant elastomer comprises an O-ring with a circular profile inserted in the grooved rim of the lid.

4. The leak resistant cooking pan of claim 1, wherein the heat resistant elastomer comprises an O-ring with a flattened profile placed in the grooved rim of the lid.

5. The leak resistant cooking pan of claim 1, wherein the heat resistant elastomer is placed along an inner diameter and an outer diameter of the grooved rim.

6. The leak resistant cooking pan of claim 5, wherein the top edge of the sidewall of the body forms a pressure fit between the heat resistant elastomer along the inner diameter and the outer diameter of the grooved rim.

7. The leak resistant cooking pan of claim 1, wherein the heat resistant elastomer comprises a silicone polymer.

8. The leak resistant cooking pan of claim 1, wherein the leak resistant cooking pan comprises a cylindrical shape or an oval shape.

9. The leak resistant cooking pan of claim 1, comprising a latch configured to hold the lid to the body.

10. The leak resistant cooking pan of claim 9, wherein the latch comprises a hinged assembly mounted to the lid, wherein the hinged assembly is configured to lock to a protrusion mounted to the body.

11. The leak resistant cooking pan of claim 9, wherein the latch comprises a flexible cord.

12. The leak resistant cooking pan of claim 11, wherein the flexible cord is mounted to a handle on the lid.

13. The leak resistant cooking pan of claim 11, comprising a hook configured to attach to a handle on the body.

14. The leak resistant cooking pan of claim 1, comprising an air inlet valve to allow air to flow into the leak resistant cooking pan.

15. The leak resistant cooking pan of claim 1, wherein the body comprises steel, copper, a steel alloy, a copper alloy, aluminum, or any combination thereof.

16. The leak resistant cooking pan of claim 1, wherein the body comprises glass, ceramic, or both.

17. The leak resistant cooking pan of claim 1, wherein an interior surface of the body comprises a non-stick material.

18. The leak resistant cooking pan of claim 17, wherein the non-stick material comprises a ceramic.

19. The leak resistant cooking pan of claim 17, wherein the non-stick material comprises a fluoropolymer.

20. The leak resistant cooking pan of claim 1, wherein the body comprises a thickened base configured to distribute heat.

* * * * *